Nov. 30, 1954 R. B. TROUSDALE 2,695,954

PULSE MODULATION RECONSTRUCTOR CIRCUIT

Original Filed Dec. 24, 1949

INVENTOR.
Robert B. Trousdale
BY T. L. Bowes
Att'y

United States Patent Office 2,695,954

Patented Nov. 30, 1954

2,695,954

PULSE MODULATION RECONSTRUCTOR CIRCUIT

Robert B. Trousdale, Rochester, N. Y., assignor to Stromberg-Carlson Company, a corporation of New York Original application December 24, 1949, Serial No. 134,974. Divided and this application April 27, 1950, Serial No. 158,540

11 Claims. (Cl. 250—27)

Figures 1, 2:
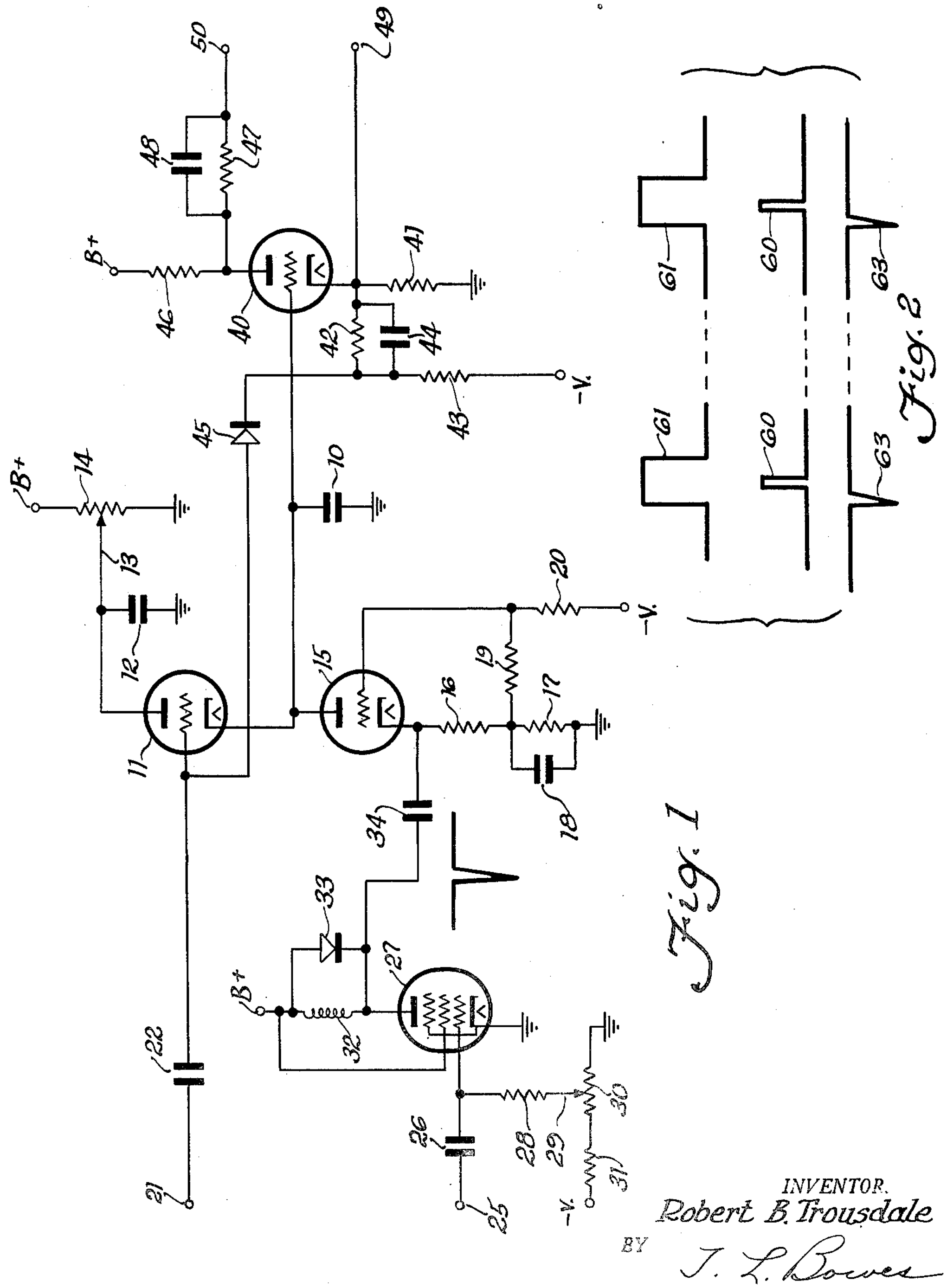

The present invention relates to a pulse modulation reconstructor circuit, and, more particularly, to a pulse modulation reconstructor circuit for reconstructing the modulation components of an amplitude modulated pulse wave train. Specifically, the present application is a divisional application of a joint application to Frank A. Morris and Robert B. Trousdale, Serial No. 134,974, filed on December 24, 1949, and assigned to the same assignee as the present application.

In many instances it is necessary to demodulate an amplitude modulated pulse wave train so as to obtain the original modulation or intelligence signals. In such a demodulation process, the intelligence signals may be said to be reconstructed fom the signal bearing pulses which are amplitude modulated with the desired intelligence signals. For example, in an electronic telephone system of the character described in the above-identified co-pending application, the original intelligence signals must be reconstructed from a series of amplitude modulated multiplexer pulses. One such arrangement for obtaining an output voltage, the envelope of which corresponds to the modulation signal, is disclosed in co-pending application to Frank A. Morris, Serial No. 157,085, filed on April 20, 1950, and assigned to the same assignee as the present application. In the arrangement disclosed by Morris, a storage capacitor is provided which is charged in proportion to the amplitude of each intelligence bearing pulse and is discharged immediately preceding each intelligence bearing pulse so as to provide a wave form, the envelope of which corresponds to the original intelligence signal. While this arrangement is satisfactory for its intended purpose, the output voltage obtainable from the storage capacitor is limited due to the fact that the bias voltage on the charging tube changes with the capacitor voltage so as to change the bias voltage of the charging tube and to alter the balanced condition between the charging and discharging tubes.

Accordingly, it is an object of the present invention to provide a new and improved pulse modulation reconstructor circuit in which a relatively high output voltage may be obtained.

It is another object of the present invention to provide a new and improved pulse modulation reconstructor circuit the input circuit of which is substantially unaffected by changes in the output voltage obtained therefrom.

It is a further object of the present invention to provide a new and improved pulse modulation reconstructor circuit in which means are provided for obtaining extremely short discharge pulses coincident with the leading edge of a relatively wide control pulse.

The invention, both as to its organization and method of operation, together with further objects and advantages thereof, will best be understood by reference to the following specification taken in connection with the accompanying drawings in which:

Fig. 1 is a schematic diagram of a pulse modulation reconstructor circuit embodying the principles of the present invention, and Fig. 2 illustrates timing wave forms which occur in certain portions of the circuit of Fig. 1.

The pulse modulation reconstructor circuit of the present invention contemplates the employment of a pair of electron discharge devices which are connected to a storage capacitor and controlled by means of charging and discharging pulses so as to reconstruct across the storage capacitor a voltage, the envelope of which is equal to the modulation superimposed on the charging pulses.

By way of example, the reconstructor circuit may be supplied with signal bearing pulses derived from an electronic signal multiplexer which operate to charge the capacitor by an amount proportional to the amplitude of each pulse. Upon the cessation of each pulse, the capacitor maintains its charge until the occurrence of a discharging pulse which immediately precedes the following charging pulse at which time the capacitor is discharged rapidly to a predetermined voltage level.

While the reconstructor circuit of the present invention is particularly well adapted for use with and will be described in connection with an electronic telephone system for reconstrucing modulation signals which appear upon signal bearing multiplexer pulses of the system, it will be understood that the pulse modulation reconstructor circuit of the present invention has numerous other applications and may be employed whenever it is necessary to reconstruct from an amplitude modulated pulse wave train the original modulation signal.

Referring now more particularly to the drawing, there is illustrated in Fig. 1 a pulse modulation reconstructor circuit embodying the principles of the present invention. As shown, a storage capacitor 10, which is to be charged and discharged in accordance with the amplitude of signal bearing input pulses, is arranged to be charged by means of a first electron discharge device 11. Thus, the cathode of the device 11 is connected to the ungrounded terminal of the capacitor 10 and the anode of the device 11 is connected to ground through a by-pass capacitor 12 and to the arm 13 of a potentiometer 14 connected between the B+ supply source and ground. The ungrounded terminal of the capacitor 10 is also connected to the anode of a second discharge device 15, which is utilized to discharge the capacitor, the cathode of the device 15 being connected through resistors 16 and 17 to ground potential. A by-pass condenser 18 is connected across the resistor 17, and a series combination of resistors 19 and 20 is connected from the junction point of resistors 16 and 17 to a negative source of potential. The control electrode of the device 15 is connected to the junction point of resistors 19 and 20. To control the periods of conduction of the device 11, positive signal bearing pulses are applied to the input terminal 21 and through the coupling capacitor 22 to the control electrode of the device 11. In order to discharge the storage capacitor 10, positive discharge pulses, having a predetermined time relation with respect to the charging pulses, to be described in more detail hereinafter, are applied to a second input terminal 25 and through a coupling capacitor 26 to the control electrode of a third electron discharge device 27. The control electrode of the device 27 is connected through a resistor 28 to the arm 29 of a potentiometer 30. The potentiometer 30 is connected in series with a resistor 31 from a negative source of potential to ground. The anode of the device 27 is connected through an inductance 32 to the B+ supply, there being a rectifying device 33 connected across the inductance 32 with the cathode of the device 33 connected to the anode of the device 27. Output voltage from the anode of the device 27 is impressed upon the cathode of device 15 through a coupling capacitor 34.

To utilize the voltage produced across the storage capacitor 10, there is provided an output stage comprising a fourth electron discharge device 40, the control electrode of which is connected to the ungrounded terminal of the capacitor 10. The cathode of device 40 is connected through a resistor 41 to ground, and is also connected through resistors 42 and 43 to a negative source of potential. A by-pass capacitor 44 is connected across the resistor 42. A feed back path between the output stage 40 and the charging device 11 is also provided which includes a rectifying device 45 having its cathode connected to the junction point of the resistors 42 and 43 and its anode connected to the control electrode of the device 11. A phase inverted output voltage from the device 40 is provided by means of an anode load resistor 46 and a coupling network including a resistor 47 and capacitor 48 connecting the anode of device 40 to the output terminal 50.

In considering the operation of the above-described pulse modulation reconstructor circuit, reference may now be had to Fig. 2 wherein there is shown certain wave forms which may be applied to the circuit of Fig. 1. While the input wave forms of Fig. 2 are of the type produced in an electronic telephone system as disclosed in the above identified co-pending application, Serial No. 134,974, and these wave forms are particularly suitable for excitation of the pulse reconstructor circuit of Fig. 1, it will be understood that suitably timed input wave forms derived from other sources may be utilized to charge and discharge the storage capacitor in the proper sequence thereby to reconstruct modulation signals superimposed on one of the input wave forms. As shown in Fig. 2, the charging pulses 60 applied to the terminal 21 of the reconstructor circuit are positive pulses and have amplitudes which vary in accordance with the original intelligence signal. The charging pulses 60 are of relatively short duration and are separated by a relatively long interval equal to the duration of one time position frame as used in a decimal type multiplexing system such as that employed in the electronic telephone system referred to above. The time position of successive time position frames during which the signal bearing input pulses 60 occur are defined by gate pulses 61, which are of substantially greater width than the charging pulses 60 and are coincident therewith. More specifically, each signal bearing pulse 60 occurs approximately at the center of each gating pulse 61. Unlike the input pulses 60, the input pulses 61 are not modulated in amplitude and merely serve to control the discharging of the capacitor 10. Specifically, the leading edge of each pulse 61 is utilized to develop a negative pulse indicated in Fig. 2 as the pulse 63 which occurs coincident in time with the leading edge of the pulse 61 and is supplied to the cathode of the device 15 to effect discharging of the capacitor 10.

In considering the operational details of the above-described pulse modulation reconstructor circuit, it is first pointed out that this circuit functions to store the amplitude of signal modulated input pulses 60 for an interval equal to the time between pulses. In general, this is accomplished by charging the condenser 10 through the charging tube 11 in accordance with the amplitude of each pulse supplied to the input terminal 21 of the reconstructor circuit and discharging this condenser through the tube 15 just prior to each such condenser charging operation.

Normally, the charging tube 11 is biased beyond cutoff by the potential impressed upon the control grid thereof through the crystal rectifier 45 from the bleeder resistors 41, 42 and 43. Since the condenser 10 must be discharged between successive charging pulses, this condenser is chosen to have a small capacitor value. In order positively to prevent charging of this condenser during the off pulse periods, it is essential that the tube 11 be maintained completely non-conducting during such periods. To this end, a high gain triode is used as the condenser charging tube 11. This tube is operated at a very low anode voltage through the expedient of utilizing the bleeder potentiometer 14 to supply anode voltage to the tube 11. Normal bias for the condenser discharging tube 15 is supplied from the bleeder circuit 17, 19 and 20, this bias being sufficient normally to cut off space current flow through the tube 15. Similarly, the tube 27, which acts as a wave shaping device, is normally biased well below cutoff by the potential impressed upon the control grid thereof from a bleeder circuit comprising the potentiometer 30 and the resistor 31.

Discharging pulses impressed upon the terminal 25 in the time relationship explained above are impressed upon the control grid of the wave shaping, or peaker, tube 27 through the condenser 26. Each such pulse has the effect of causing current conduction through the peaker tube 27 for the duration of the pulse. The anode circuit of this tube consists of an inductance element 32 shunted by a crystal rectifier 33. The inductance element 32 is tuned to resonance at a very high frequency, several times greater than the frequency of the discharging pulses 61 by the stray capacitances associated therewith. Thus, the inductance element 32 effectively comprises a resonant circuit which is shock excited into oscillation as the leading edge of each discharging pulse is impressed upon the control grid of the wave shaping tube 27 to start current conduction through this tube. However, the rectifier 33 in shunt with the inductance element 32 only allows the first half cycle of the first oscillatory transient to develop, following which it absorbs all energy stored in the inductance element 32. It will thus be understood that as each finder gate pulse builds up to full amplitude, a very sharp pulse 63 of negative polarity (Fig. 2) is developed at the anode of the peaker tube 27. This pulse is coincident with the leading edge of the corresponding discharge pulse 61. At the end of each discharge pulse, current conduction through the tube 27 is cut off, thereby tending to produce a rise in the anode potential of the tube. However, the tube anode is already at the potential level of the anode current supply source due to the action of the rectifier 33 and as a consequence no pulse whatever is produced on this anode as each discharging pulse ends.

The sharp negative pulse 63 thus developed coincident with the leading edge of each discharging pulse 61 (Fig. 2) is utilized to effect discharging of the condenser 10 just before this condenser is recharged to the amplitude of a new signal modulated input pulse supplied to the reconstructor circuit. In this regard, it will be recalled that each input pulse delivered to the input of the device 11 occurs approximately at the center of a coincident discharging pulse. Each negative pulse developed at the anode of the tube 27 during the initial portion of a discharging pulse is impressed upon the cathode of the discharging tube 15 through the coupling condenser 34, and has the effect of driving the cathode of the tube 15 negative and thus effecting current conduction through this tube for the duration of the pulse. As a consequence, the condenser 10 is permitted to discharge through the space current path of the tube 15, for the duration of each pulse impressed upon the cathode of this tube. Immediately after the condenser 10 is thus discharged during each discharging pulse 63, a positive signal modulated input pulse is impressed upon the control grid of the charging tube 11 through the condenser 22 to recharge the condenser 10 to the potential level which corresponds to the amplitude of the input pulse. So long as input pulses are thus impressed upon the control grid of the charging tube 11, the condenser 10 is not fully discharged during any one condenser discharging interval, but is only discharged down to a predetermined level which insures that the amplitude of the immediately succeeding input pulse will be accurately reflected in the charge produced thereby on the condenser 10. It will thus be apparent that as the amplitude of the signal bearing input pulses impressed upon the control grid of the charging tube 11 varies in accordance with intelligence, i. e., voice or other signals derived from the input source, the voltage across the condenser 10 is correspondingly varied to detect or reproduce the intelligence component of the input pulses.

In the event that the flow of input pulses to the terminal 21 is interrupted as, for example, during the open circuit or break period of a dial impulse of the type which occurs in the operation of an automatic telephone system, and the flow of discharging pulses to the control grid of the peaker tube 27 is not interrupted during the same period, the discharging tube 15 is periodically rendered conductive during the open circuit period of each dial impulse with the result that the condenser 10 is fully discharged or is discharged down to a very low level. Thus, the reconstructor circuit of the present invention is arranged to discriminate between directive dial impulses and supervisory signals on the one hand and voice or intelligence signals on the other hand.

The bias voltage between the control grid and cathode of the charging tube 11 is in part controlled by the voltage across the condenser 10, as will be evident from an inspection of the circuit. As a consequence, large variations in the signal input level to the circuit of Fig. 1 tend to cause the operating bias voltage between the control grid and cathode of the tube 11 to vary over a relatively wide range. To minimize such variations, the above-described feed back circuit comprising the rectifier 45 is provided between the cathode of the tube 40 and the control grid of the tube 11. With this arrangement, any increase in the amplitude of the pulses impressed upon the control grid of the tube 11 produces a voltage rise across the condenser 10 to increase the positive potential level of the cathode terminal of the tube 40. Due to the increase in the positive potential level of the cathodes of tube 40 the return voltage for the rectifier 45 is correspondingly increased to produce a corresponding decrease in the bias on the grid of the tube 11. Thus the change in grid to cathode voltage of the tube 11 resulting from a large increase in the amplitude of the signal pulses delivered to the circuit of Fig. 1 is held to a minimum. Similarly, when the signal pulse amplitude drops to a low value, the voltage across the condenser 10 is correspondingly reduced and as a further result of the action of the feed back network, the bias potential level of the control grid in the tube 11 is correspondingly increased. The described "boot strap" arrangement for maintaining the grid cathode bias of the charging tube relatively constant over a wide signal input pulse amplitude range is not required in conjunction with the discharging tube 15 since the grid to cathode voltage of the latter tube is not altered as a result of changes in the amplitude of the signal input pulses.

The signal voltages thus reconstructed across the condenser 10 are positively impressed upon the control grid of the cathode follower tube 40 to effect reproduction of the reconstructed signal voltage at both the anode cathode of the tube. More specifically, the voltage developed at the cathode of the tube 40 and correspondingly at the terminal 49, is an exact replica of the voltage across the condenser 10, whereas the voltage produced at the anode of the tube 40 and correspondingly at the output terminal 50, is an inverted replica of the voltage across the condenser 10.

From the foregoing, it will be evident that the present invention provides a pulse modulation reconstructor circuit which is adapted to demodulate an amplitude modulated pulse wave train and wherein means are provided for maintaining the input circuit bias voltage of the reconstructor circuit substantially constant over a wide range of input signals. With this arrangement, amplitude modulated input pulses of relatively high amplitude may be accommodated without causing changes in the clamping level to which the storage capacitor of the reconstructor circuit is periodically connected. Further, the present invention makes possible the use of relatively high amplitude input pulses without causing a consequent discharge in the storage capacitor during the intervals between charging pulses.

By way of example, and not in any sense as a limitation to the particular values given, a pulse modulation reconstructor circuit constructed in accordance with the present invention has been found satisfactory to reconstruct the modulation components of amplitude modulated charging pulses occurring at a repetition rate of ten kilocycles and straddled by controlled discharge pulses of a similar repetition rate and having a duration of approximately one microsecond.

In the specific embodiment, the device 27 is a commercial type 6AK5 device, the devices 11 and 15 are commercial type 6AQ6 devices, and the device 40 is a type 6C4 device. Other circuit constants employed are as follows:

| | | |
|---|---|---|
| Resistor **14** | ohms | 120,000 |
| Resistor **16** | do | 10,000 |
| Resistor **17** | do | 27,000 |
| Resistor **19** | do | 2,200 |
| Resistor **20** | do | 82,000 |
| Resistor **28** | megohm | 1 |
| Resistor **30** | ohms | 100,000 |
| Resistor **31** | do | 100,000 |
| Resistor **41** | do | 4,700 |
| Resistor **42** | do | 240,000 |
| Resistor **43** | do | 680,000 |
| Resistor **46** | do | 10,000 |
| Resistor **47** | do | 360,000 |
| Capacitor **10** | mmf | 50 |
| Capacitor **12** | mfd | .005 |
| Capacitor **18** | mfd | .005 |
| Capacitor **22** | mmf | 1000 |
| Capacitor **26** | mmf | 1000 |
| Capacitor **34** | mmf | 100 |
| Capacitor **44** | mfd | .005 |
| Capacitor **48** | mfd | .005 |
| Inductance **32** | microhenries | 60 |

While there has been described what is at present considered to be the preferred embodiment of the invention, it will be understood that various modifications may be made therein which are within the true spirit and scope of the invention as defined in the appended claims.

What is claimed as new and is desired to be secured by Letters Patent of the United States is:

1. A pulse modulation reconstructor circuit for reconstructing the modulation components of narrow amplitude modulated pulses which occur coincidently with and are straddled by wider control pulses, comprising a storage capacitor, means responsive to each amplitude modulated pulse for charging said capacitor to a voltage representative of the amplitude of the pulse, means responsive to the leading edge of each control pulse for discharging said capacitor a predetermined amount just prior to charging of said capacitor to the voltage representative of the amplitude of the coincident amplitude modulated pulse, and means for varying the effective amplitude of said amplitude modulated pulses in accordance with the charge on said capacitor.

2. A pulse modulation reconstructor circuit for reconstructing the modulation components of narrow amplitude modulated pulses which occur coincidently with and are straddled by wider control pulses, comprising a storage capacitor, means for converting the leading edge of each control pulse into a sharp discharge pulse which occurs immediately preceding the occurrance of the amplitude modulated pulse straddled by the control pulse, means responsive to each discharge pulse for discharging said capacitor a predetermined amount, means responsive to each amplitude modulated pulse for recharging said capacitor to a voltage representative of the amplitude of the pulse, and means for varying the effective amplitude of said amplitude modulated pulses in accordance with the charge on said capacitor.

3. A pulse modulation reconstructor circuit for reconstructing the modulation components of narrow amplitude modulated pulses which occur coincidently with and are straddled by wider control pulses, comprising a storage capacitor, means including an electron discharge device for charging said capacitor to a voltage representative of the amplitude of said amplitude modulated pulses, means responsive to the leading edge of each control pulse for discharging said capacitor a predetermined amount just prior to charging of said capacitor to the voltage representative of the amplitude of the coincident amplitude modulated pulse, and means for controlling the bias of said device in accordance with the charge on said capacitor.

4. A pulse modulation reconstructor circuit for reconstructing the modulation components of narrow amplitude modulated pulses which occur coincidently with and are straddled by wider control pulses, comprising a storage capacitor, means for converting the leading edge of each control pulse into a sharp discharge pulse which occurs immediately preceding the occurrence of the amplitude modulated pulse straddled by the control pulse, means responsive to each discharge pulse for discharging said capacitor a predetermined amount, means including an electron discharge device for recharging said capacitor to a voltage representative of the amplitude of the pulse, and means for controlling the bias of said device in accordance with the charge on said capacitor.

5. A pulse modulation reconstructor circuit for reconstructing the modulation components of amplitude modulated signal pulses, comprising first and second electron discharge devices connected in series, a storage condenser connected to be charged through said first device and discharged through said second device, means for applying said amplitude modulated signal pulses to said first device to charge said condenser in accordance with the amplitude thereof, means for developing discharge pulses which occur immediately preceding each amplitude modulated signal pulse, means for applying said discharging pulses to said second device to discharge said condenser immediately preceding charging thereof through said first device, and means for varying the bias of said first device in accordance with the charge on said condenser.

6. A pulse modulation electron reconstructor circuit, comprising first and second electron discharge devices connected in series in the order named from a positive to a negative source of potential, a storage capacitor connected to be charged through said first device and discharged through said second device, means for applying charging pulses to said first device thereby to charge said capacitor in accordance with the amplitude of said charging pulses, means for applying discharging pulses to said second device to discharge said capacitor by a predetermined amount, and means for controlling the bias of said charging device in accordance with the charge on said capacitor, said last-named means comprising a feed back path between said capacitor and the control electrode of said first device.

7. A pulse modulation reconstructor circuit for reconstructing the modulation components of amplitude modulated signal pulses, comprising first and second electron discharge devices connected in series, a storage condenser connected to be charged through said first device and discharged through said second device, means for applying said amplitude modulated signal pulses to said first device to charge said condenser in accordance with the amplitude thereof, means for developing discharge pulses which occur immediately preceding each amplitude modulated signal pulse, means for applying said discharging pulses to said second device to discharge said condenser immediately preceding charging thereof through said first device, and means for varying the bias of said first device in accordance with the charge on said condenser, said last named means comprising a feedback path between said condenser and the control electrode of said first device and a rectifying device serially included in said feedback path.

8. A pulse modulation reconstructor circuit, comprising first and second electron discharge devices connected in series in the order named from a positive to a negative source of potential, a storage capacitor connected between the common connection of said devices and ground potential, means for applying charging pulses to said first device thereby to charge said capacitor in accordance with the amplitude of said charging pulses, means for applying discharging pulses to said second device to discharge said capacitor by a predetermined amount, and means for controlling the bias of said charging device in accordance with the charge on said capacitor, said last named means including an output electron discharge device having the control electrode thereof connected to said capacitor and having the cathode thereof effectively connected to the control electrode of said first device.

9. A pulse modulation reconstructor circuit, comprising first and second electron discharge devices connected in series in the order named from a positive to a negative source of potential, a storage capacitor connected to be charged through said first device and discharged through said second device, means for applying charging pulses to said first device thereby to charge said capacitor in accordance with the amplitude of said pulses, means for applying discharging pulses to said second device to discharge said capacitor by a predetermined amount immediately preceding each charging pulse, and means for maintaining the bias voltage of said first device substantially constant despite large changes in the amplitude of said charging pulses, said last named means including a third electron discharge device having the control electrode thereof connected to said capacitor and a rectifying device effectively connected between the cathode of said third device and the control electrode of said first device.

10. A pulse modulation reconstructor circuit, comprising first and second electron discharge devices connected in series in the order named from a positive to a negative source of potential, a storage capacitor connected between the common connection of said devices and ground potential, means for applying charging pulses to said first device thereby to charge said capacitor in accordance with the amplitude of said charging pulses, means for applying discharging pulses to said second electron discharge device, said last named means comprising a third electron discharging device having positive control pulses supplied to the control electrode thereof and having means including a parallel combination of an inductance and a crystal rectifier connected in the anode circuit thereof for supplying sharp negative discharge pulses coincident with the leading edge of said control pulses to the cathode of said second device, and means for controlling the bias voltage of said first device in accordance with the charge on said capacitor.

11. A pulse modulation reconstructor circuit, comprising first and second electron discharge devices connected in series in the order named from a positive to a negative source of potential, a storage capacitor connected between the common connection of said devices and ground potential, means for applying charging pulses to said first device thereby to charge said capacitor in accordance with the amplitude of said charging pulses, means for applying discharging pulses to said second electron discharge device, said last named means comprising a third electron discharge device having positive control pulses supplied to the control electrode thereof, and having means including a parallel combination of an inductance and a crystal rectifier connected in the anode circuit thereof for supplying sharp negative discharge pulses coincident with the leading edge of said control pulses to the cathode of said second device, and means for controlling the bias voltage of said first device in accordance with the charge on said capacitor, said last named means comprising a feed back path between said capacitor and the control electrode of said first device and including a rectifying device having the anode thereof connected to the control electrode of said first device.

References Cited in the file of this patent

UNITED STATES PATENTS

| Number | Name | Date |
|---|---|---|
| 2,210,995 | White | Aug. 13, 1940 |
| 2,237,661 | Ernst | Apr. 8, 1941 |
| 2,403,624 | Wolf | July 9, 1946 |
| 2,444,437 | Grieg | July 6, 1948 |
| 2,461,144 | Cook | Feb. 8, 1949 |
| 2,466,705 | Hoeppner | Apr. 12, 1949 |
| 2,476,959 | Chatterjea et al. | July 26, 1949 |
| 2,541,986 | Cleeton | Feb. 20, 1951 |
| 2,567,247 | Spalding | Sept. 11, 1951 |
| 2,576,339 | Gray | Nov. 27, 1951 |